US011290405B2

(12) United States Patent
Suri

(10) Patent No.: US 11,290,405 B2
(45) Date of Patent: Mar. 29, 2022

(54) METHOD, SYSTEM AND APPARATUS FOR PROVIDING A CONTEXTUAL KEYWORD COLLECTIVE FOR COMMUNICATION EVENTS IN A MULTICOMMUNICATION PLATFORM ENVIRONMENT

(71) Applicant: SCARAMANGA TECHNOLOGIES PVT. LTD., New Delhi (IN)

(72) Inventor: Arvind Suri, New Delhi (IN)

(73) Assignee: SCARAMANGA TECHNOLOGIES PVT. LTD., New Delhi (IN)

( * ) Notice: Subject to any disclaimer, the term of this patent is extended or adjusted under 35 U.S.C. 154(b) by 12 days.

(21) Appl. No.: 16/640,929

(22) PCT Filed: Sep. 17, 2019

(86) PCT No.: PCT/IN2019/050678
§ 371 (c)(1),
(2) Date: Feb. 21, 2020

(87) PCT Pub. No.: WO2020/075180
PCT Pub. Date: Apr. 16, 2020

(65) Prior Publication Data
US 2021/0144112 A1   May 13, 2021

(30) Foreign Application Priority Data
Oct. 10, 2018   (IN) .............................. 201811038364

(51) Int. Cl.
*G06F 16/00* (2019.01)
*H04L 51/00* (2022.01)
(Continued)

(52) U.S. Cl.
CPC ............ *H04L 51/16* (2013.01); *G06F 16/345* (2019.01); *G06F 40/205* (2020.01);
(Continued)

(58) Field of Classification Search
CPC ..... H04L 51/16; H04L 51/046; G06F 16/345; G06F 40/279; G06F 40/268;
(Continued)

(56) References Cited

U.S. PATENT DOCUMENTS

2006/0080321 A1* 4/2006 Horn .................... G06F 16/9535
2010/0077054 A1* 3/2010 Harada ................... H04L 51/24
709/207
(Continued)

*Primary Examiner* — Khai M Nguyen

(57) ABSTRACT

The invention provides a system, a method and an apparatus for creating and presenting intelligent contextual summary highlighting the essence of previous communication events happening between a user of a wireless communication device and his/her contact. The system captures messages in the communication events; arranges them in chronological order of occurrence; summarizes them into a contextual summary, removing unwanted words; provides weightage to each word in the contextual summary based on number of times each word occurs in the communication events, chronological order of its communication events, and dictionary importance of each word; determining who all other contacts are talking related to topic of contextual summary; and consequently creating the intelligent keyword collective for each contact representing context of the recent conversations with the contact. The system further presents the keyword collective to the user at the communication device, on occurrence of one or more triggering events.

24 Claims, 3 Drawing Sheets

(51) Int. Cl.
*G06F 16/34* (2019.01)
*G06F 40/279* (2020.01)
*G06F 40/268* (2020.01)
*G06F 40/205* (2020.01)
*H04M 1/72436* (2021.01)
*H04M 1/72472* (2021.01)
*H04L 51/046* (2022.01)
*H04L 51/10* (2022.01)
*H04M 1/656* (2006.01)
*H04W 8/18* (2009.01)

(52) U.S. Cl.
CPC .......... *G06F 40/268* (2020.01); *G06F 40/279* (2020.01); *H04L 51/046* (2013.01); *H04L 51/10* (2013.01); *H04M 1/656* (2013.01); *H04M 1/72436* (2021.01); *H04M 1/72472* (2021.01); *H04W 8/183* (2013.01)

(58) Field of Classification Search
CPC ............ G06F 40/205; H04M 1/72436; H04M 1/72472; H04M 1/656; H04W 8/183
See application file for complete search history.

(56) References Cited

U.S. PATENT DOCUMENTS

| | | | |
|---|---|---|---|
| 2011/0213785 A1* | 9/2011 | Kristiansson | G06Q 50/01 707/748 |
| 2016/0255037 A1* | 9/2016 | Spivack | G06Q 10/10 706/12 |
| 2016/0259778 A1* | 9/2016 | Cookson | G06Q 10/107 |

* cited by examiner

METHOD, SYSTEM AND APPARATUS FOR PROVIDING A CONTEXTUAL KEYWORD COLLECTIVE FOR COMMUNICATION EVENTS IN A MULTICOMMUNICATION PLATFORM ENVIRONMENT

FIELD OF INVENTION

The present invention generally relates to a method and a system for providing contextual keyword collective for communication events between a user and a contact. More particularly, the present invention relates to a system and a method for creating and assigning a contextual meaningful, short gist or snippet of keywords to one or more communication events happening over one or more communication platforms between a user and his/her contact at a user device.

BACKGROUND OF INVENTION

With the advent of technology in communication services through wireless devices, a user of a wireless device is able to easily communicate with other users via a variety of modes of communications. Not just via voice or SMS messaging service, various other communication services, like e-mails, instant messaging, social network services are implemented in the wireless communication devices. Addition of such services expanded on the degree, granularity and range of the information that could be shared between the user and his/her contacts. Using a variety of communication services by the user, on the same wireless device, presents the user with an enormous data or information shared with the other contacts. In addition, using multiple communication services on the same wireless device consume more power and device hardware functionalities.

Further, in situations where the enormous data that is being shared between the user over the multiple platforms and his/her multiple contacts, the user usually tends to forget or give less attention to the depth of contextual understanding for the communication that is being conducted between two users over the multiple communication services. Also, the user may tend to forget his/her last conversation with a particular contact, which might be important for future conversations. For being up to date with the recent conversations, the user has to navigate through the multiple conversations happening on each of the multiplicity of communicating services, for each desired contact. This may be time-taking, and in a lot of situations, where the user is immediately presented with a call or an SMS or an instant message from a particular contact, the user may not have time to do such activity, or simply in other scenarios may not even opt to do such activities because of lack of time or interest.

Further, in order to be updated with the recent communication there is a requirement from the user to access each of the communication platforms, individually and read through the recent communication with the contact. This requirement of accessing multiple communication platforms consumes unnecessary processing power and battery life of a wireless device that could be used for other critical services. The processing capabilities and power source is limited in a wireless device as compared to a standalone computer.

Furthermore, there have been prior art technologies which have provided a system or an application capable of analyzing plurality of messages of a user, assigning them with a label describing a topic of the messages and providing the label to the user on an interface. Other technologies provide systems for collecting and presenting historical communication data for a mobile device. The information presented to a user of the mobile communication device is the user contact information, related contact information, communication history and files shared between the user and the selected contact. There are other methods provided in the present technologies for extracting keywords from interactive text dialog and providing the extracted keywords as a dialog summary display. Although, there are presently technologies which are providing a user with an overview of the previous conversations, but they fail to provide a contextual importance to the conversations and provide a weightage to the contextual meaning of the conversations.

Hence, there is no existing platform that enables viable bridge between various communication platforms and combines ease of use with contextual awareness for recent communication history.

OBJECTS OF INVENTION

The present invention overcomes the above mentioned problems with conventional digital platforms. The present invention provides a method and a system for providing contextual summary as contextual keyword collective or contextual keywords phrase for the recent communication of a user with each of the contacts in a user device.

Therefore, it is an objective of the present invention to provide a system, a method and an apparatus that provide an intelligent, short communication summary, to a user for each of his/her contacts in a communication device.

It is an objective of the present invention to provide a method and a system for creating and presenting in form of an intelligent keywords phrase, customized topic for communication of the user with his/her contacts based on communication history in a multi-platform communication device.

It is also an objective of the present invention to create the intelligent keywords phrases representing recent conversations with the user contacts, based on extracting contextual meaning of the recent conversations and determining weightage for a contextual syntax in a sentence.

It is further an objective of the present invention to determine a group of contacts of the user who are communicating over the same/similar topic for influencing the context and suggestions for a message or a call received by the user.

The foregoing and other objects, features and advantages of the invention will be apparent from the following more particular descriptions of exemplary embodiments of the invention.

SUMMARY OF INVENTION

The present invention provides a system for creating and providing an intelligent contextual keyword phrase to a user using a user device, the system comprising:
the user device including:
a memory storing the application executable by one or more processors at the user device;
a contact list of one or more contacts stored in the memory;
one or more communication applications stored in the memory and executable by one or more processors at the user device for providing communication platforms to the user and executing plurality of communication events at the user device; and the application including:
- a capturing module for creating communication information that includes information related to a plurality of communication events between the user and each contact in the contact list and one or more communication events of the user on one or more web-based servers, and the capturing module arranges the communication information in chronological order for communication events related to each contact in the contact list and the web-based servers;
- a summarization module for summarizing the chronologically arranged captured communication information into a summarized gist;
- a context generation module for providing a contextual meaning to every word included in the summarized gist to create a contextual summary;
- a weightage module for providing a contextual weightage to each word in the contextual summary; and
- a matrix creating module for creating a confusion matrix that correlates the contextual summary with one or more other contacts in the contact list based on conversations between the user and the one or more other contacts in the contact list that are related to the contextual summary; and wherein the application creates the intelligent contextual keyword phrase for one or more communication events between the user and each contact in the contact list, and one or more communication events of the user on the one or more web-based servers, the intelligent contextual keyword phrase includes the contextual summary along with its associated confusion matrix.

The present invention provides a method of creating and providing an intelligent contextual keyword phrase to a user using a user device, the intelligent contextual keyword phrase being created and provided to the user by an application stored in memory of the user device and executable by one or more processors at the user device, the method comprising:
- creating, by a capturing module of the application, communication information that includes information related to a plurality of communication events between the user and each contact in a user contact list and one or more communication events of the user on one or more web-based servers, the contact list being stored at the user device of the user, and the plurality of communication events being executed at the user device;
- arranging, by the capturing module, the communication information in chronological order for the plurality of communication events related to each contact in the contact list and the web-based servers;
- summarizing, by a summarization module of the application, the chronologically arranged captured communication information into a summarized gist;
- providing, by a context generation module of the application, a contextual meaning to every word included in the summarized gist to create a contextual summary;
- providing, by a weightage module of the application, a contextual weightage to each word in the contextual summary; and
- creating, by a matrix creating module of the application, a confusion matrix that correlates the contextual summary with one or more other contacts in the contact list based on conversations between the user and the one or more other contacts in the contact list that are related to the contextual summary; and wherein the application creates the intelligent contextual keyword phrase for one or more communication events between the user and each contact in the contact list, and one or more communication events of the user on the one or more web-based servers, the intelligent contextual keyword phrase includes the contextual summary along with its associated confusion matrix.

The present invention provides a non-transitory computer readable recording medium having recorded therein at least part of a software application executable, at least partly, by one or more processors of a user device to perform a method, the user device includes:
- the one or more processors;
- memory storing at least part of operating system to facilitate, at least in part, operations of the software application; and
- wherein the method comprising:
  - creating, by a capturing module of the application, communication information that includes information related to a plurality of communication events between the user and each contact in a user contact list and one or more communication events of the user on one or more web-based servers, the contact list being stored at the user device of the user, and the plurality of communication events being executed at the user device;
  - arranging, by the capturing module, the communication information in chronological order for the plurality of communication events related to each contact in the contact list and the web-based servers;
  - summarizing, by a summarization module of the application, the chronologically arranged captured communication information into a summarized gist;
  - providing, by a context generation module of the application, a contextual meaning to every word included in the summarized gist to create a contextual summary;
  - providing, by a weightage module of the application, a contextual weightage to each word in the contextual summary;
  - creating, by a matrix creating module of the application, a confusion matrix that correlates the contextual summary with one or more other contacts in the contact list based on conversations between the user and the one or more other contacts in the contact list that are related to the contextual summary; and
  - prompting the intelligent contextual keyword phrases that includes the contextual summary along with its associated confusion matrix, by the application, to the user, at the user device, at one or more triggering events, and wherein the application creates the intelligent contextual keyword phrase for one or more communication events between the user and each contact in the contact list, and one or more communication events of the user on the one or more web-based servers, the intelligent contextual keyword phrase includes the contextual summary along with its associated confusion matrix.

DETAILED DESCRIPTION OF INVENTION

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides an apparatus, a system, and a method for creating and assigning 'contextual keyword collective' or 'contextual keyword phrases' collectively representing a plurality of communication events between a user and his/her contacts via a user device, such as a smart phone. The present invention captures a plurality of communication events of the user with various contacts over various communication channels, provides them with chronological imprints, generates contextual fields for important words used in the communication events, determines weightage for each word along with its context, where the weightage depends on a number of factors, such as frequently occurring words, dictionary meaning, chronological appearance, and hence creates an intelligent and contextual keyword phrase which represents a short summary for all the communication events collectively, between the user and each of his/her contacts in the user device. Therefore, for all the communication events happening between the user and his/her one contact (as an example one contact), a contextual keyword phrase is created and presented to the user at a time, which represents a short summary collectively for all those communication events.

Figure 1:
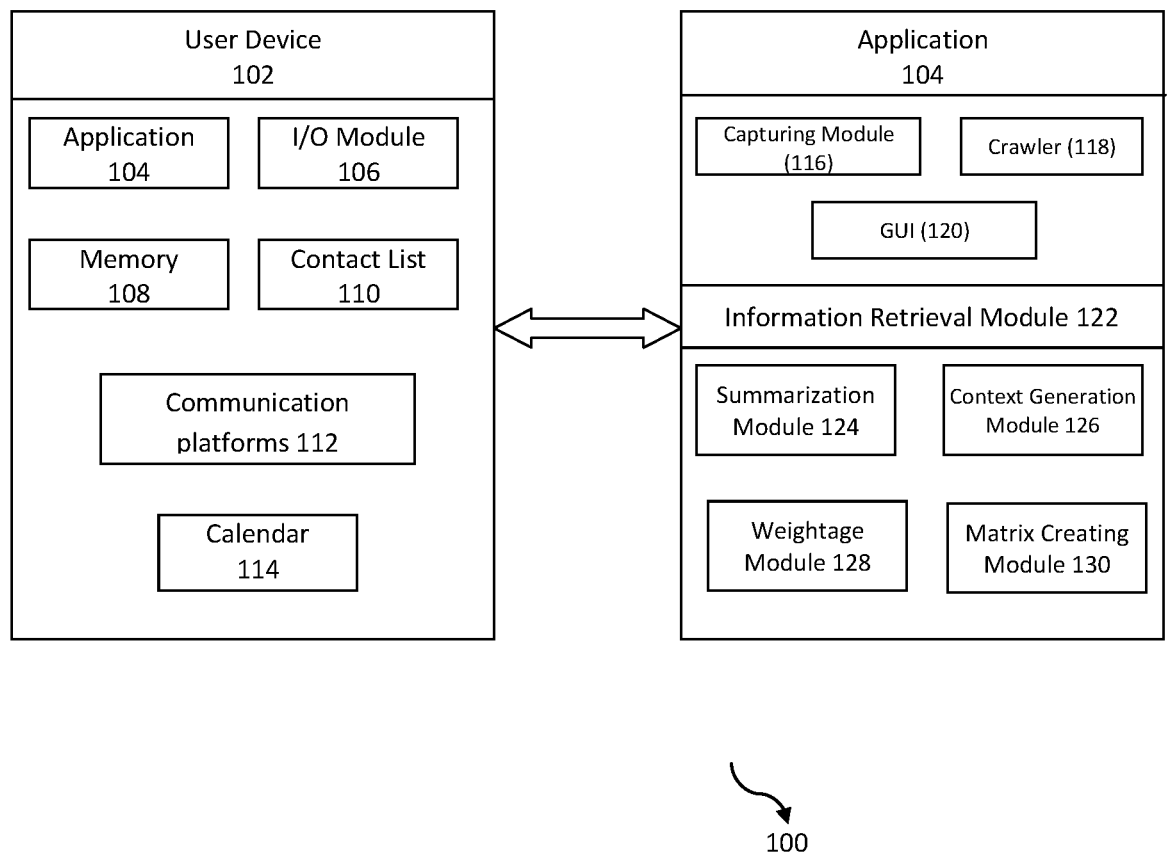
FIG. 1 illustrates an exemplary environment including a system for generating intelligent contextual keyword collective for a plurality of communication events in a multi-communication platforms environment, in accordance with an embodiment of the present invention.

FIG. 1 illustrates an exemplary environment including the system for generating intelligent contextual keyword collective for a plurality of communication events in a multi-communication platforms environment, in accordance with an embodiment of the present invention. The system 100 for generating intelligent contextual keyword collective comprises a user device 102 and an application 104 residing on the user device 102. The user device 102 may include an electronic communication device such as and not limited to a computer, a laptop, a smart phone, a tablet, an I-Phone, an I-Pad, and the like. The computer implemented system 100 comprises the application 104, which may also be referred to as 'app' throughout the detailed description without deviating from the meaning and scope of the present invention. The application 104 may be a mobile application or a web-based application or both that is run and is accessible on the user device 102. A user operates the user device 102 for wirelessly communicating with other users, or contacts stored in the user device 102.

The user device 102 further includes an Input/Output module 106 which may include and is not restricted to a keyboard, a touch pad, a mouse, a camera, a speaker, a microphone, a display screen and the like, utilized by the user to send and/or receive messages or calls and execute a communication event. The user device 102 has a memory 108 (and/or processors) for storing, running and processing the application 104, and also stores other entities, such as software programs to run the application 104. Further, the user device 102 also includes a contact list 110 stored in the memory 108. The contact list 110 of the user may include information related to a number of contacts of the user, where the information may include and is not restricted to name, phone number, address, email address, contact IDs on one or more communication platforms or applications, a picture, and the like.

The user communicates with one or more of his/her contacts via one or more communication applications 112 stored in the memory 108 of the user device 102. The communication application 112 is any communication channel or platform which the user may utilize to contact his/her contacts through the user device 102. Therefore, the one or more communication applications 112 may include and are not restricted to an SMS service, a voice call service, an email application, an audio/video application, such as Skype™, an instant messaging application, such as WhatsApp™ and the like which allows the user to send and/or receive a message, whether a voice message or a text message, to and/or from a contact. Further, the user device 102 may also include a calendar 114 that stores events for the user with time and date stamps.

The user may get involved in a plurality of communication events where communication or messages from various contacts in the contact list 110 are exchanged over various communication channels 112. The application 104 silently captures such communication events in the background. The captured data is stored on the user device, 102, itself. These captured communication events with multiple messages are then arranged in a chronological order for each contact of the user. The chronologically arranged communication events are then processed as part of an information retrieval process in the background, where the application 104 executed in the user device 104 generates a contextual and intelligent keyword collective for all the earlier communication events of each contact of the user. 'Keyword collective' may also be interexchangeably used with 'keyword phrase' hereinafter throughout the description of the present invention, without deviating from the meaning and scope of the present invention.

A contextual keyword phrase, generated by the application 104, collectively represents the plurality of communication events, corresponding to a particular contact, where the communication events include exchanging of messages, whether voice or text, between a particular contact and the user. It may be apparent to a person skilled in the art that the messages that can be exchanged by the user, and captured by the application 104 may include and is not restricted to a voice message, a text message, a multimedia message, an image, a GIF, and the like, without deviating from the meaning and scope of the present invention.

As mentioned above, the application 104 silently captures the communication events for each contact, using a capturing module 116. The capturing module 116 extracts all the messages included in the communication events for each contact and store them locally in the memory 108. Further, the application 104 also includes an information crawler 118 that continuously crawls the Internet, and collects information from publically available trusted sources of information which are related to the communication events for each contact. Furthermore, the application 104 also extracts information available in the events stored in the calendar 114, which are either related to the contact and/or the communication events with that particular contact. After gathering all the information related to the communication events for each user using the capturing module 116 and the information crawler 118, the application 104 locally stores the gathered information in the memory 108 of the device. In an embodiment, the application 104 may also store the gathered information related to the communication events for each user on a web-server, such as a cloud server, and may extract the information from the server whenever needed.

The information, including the captured messages, information extracted from the publically available trusted sources and the calendar events 114, related to the communication events between a particular contact and the user may be hereinafter referred to as 'communication information' for that particular contact. Thereafter collecting the communication information, the application 104 arranges the communication information, for each contact, in a chronological order. The chronologically arranged communication information is then processed as part of an information retrieval process in the background for providing the user with a contextual summarized keyword phrase and a contextual suggestion as a response to the recent conversations with a contact on a user interface 120 of the user device 102.

While processing the captured communication information, the application 104 implements an information retrieval module 122 for generating the intelligent contextual keywords phrases for the communication information for each contact and presenting, on the user interface 120, a 'contextual intelligent response' corresponding to the communication information. The information retrieval module 122 includes a summarization module 124, a context generation module 126, a weightage module 128 and a matrix creating module 130. The summarization module 124 summarizes the messages exchanged from a contact of the user, into lesser number of sentences, such as summarized to one or two sentences only. The messages that are summarized may include and are not limited to SMS, emails, instant messages exchanged over one or more communication applications, voice messages, multimedia, and the like. Further, plurality of words included in the summarized sentences are assigned with context fields which reflect meaning and importance of the words by determining entities related to those words, where the entities may include and not restrict to names, places, things, concepts, time, date, organizations, recognition, designation, and the like. The assigning of context fields to the summarized sentences is executed by the context generation module 126.

Thereafter, the weightage module 128 provides a weightage to each word depending on a number of factors, including and not restricting to frequency of usage, chronological appearances in the communication information, dictionary meaning and the like. After assigning a weight to each of the word in a conversation with a contact, a confusion matrix is calculated with each word being a feature, by the matrix creating module 130. The confusion matrix determines a group of contacts talking about the same or similar topics of the conversations. These sets of contacts talking about similar topics may be hereinafter termed as "Contact Groups" throughout the description of the present invention. The conversations with various contacts in a "Contact Group" will influence setting up of the context of a communication event, such as an incoming or outgoing call and will also impact automatically suggested responses for the communication events, such as in messages.

Resultantly, the application 104 creates the intelligent contextual keyword phrase for each contact that accounts for the weightage provided to each word used in the conversation with a particular contact and their importance in the conversations with the other contacts falling in the contact groups of that contact. Detailed functions of the application 104 and the information retrieval module 122 are explained in the next FIG. 2.

Figure 2:
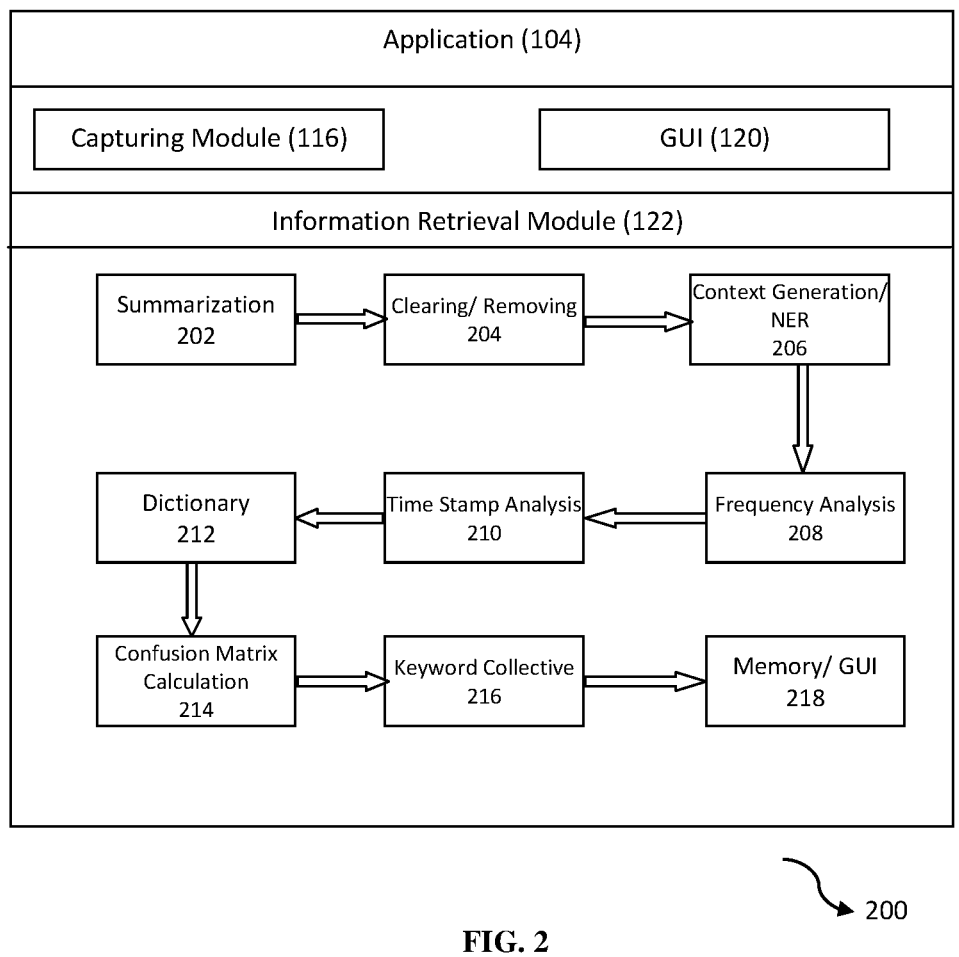
FIG. 2 illustrates an exemplary environment including an apparatus for generation of the intelligent contextual keyword collective, in accordance with an embodiment of the present invention.

FIG. 2 illustrates an exemplary environment including an apparatus for generation of the intelligent contextual keyword collective, in accordance with an embodiment of the present invention. With time, as the user utilizes the user device 102 to contact one or more contacts of his/her contact list 110 via the one or more communication platforms 112, the apparatus 200 including the application 104 silently captures the conversations in such communication events happening between the user and the contact(s) in the background, using the capturing module 116. As apparent to a person skilled in the art, that the user may contact or exchange conversations with the one or more contacts in a variety of formats, such as including and not restricted to an SMS message, an instant message from over the various communication platforms 112, an email, a voice message, a multimedia, an image, or any other message exchanged on a social network platform. The application 104 is able to capture the conversations in all the formats aforementioned, and is able to recognize the messages on the social network, from a particular contact, by using the information stored in the contact list, such as a social network ID.

Along with the above conversations, the application 104 also surfs the Internet continuously to crawl and gather information related to the conversations of the user with the contact(s) and conversations of the user with corporate communities or organizations either over the Internet or via any communication platform using the user device. The application 104 gathers relevant information from other sources like Internet. This information gathering is based on two factors, first being the topics discussed with the contact over various other channels and second being industry specific data for example if it is a call from a bank or a credit card agency then the information gathered by the application 104 may include dues and account information that were sent by various banks to the user over emails and SMS messages. Another example includes if the call is from a hospital, then information gathered by the application 104 may include the last prescription, appointments and test reports. Therefore, the application 104 may also gather information about corporate communications that the user is in contact with. The application 104 churns out the relevant information from the data stored on the user device or web portals of other service providers and renders them to a user on the fly.

Further, the application 104 also extracts information from the events stored in the calendar 114 which relates to the contact(s) or the user or the conversations with the contact(s), individually or in combination. Such information, captured by the application 104, is collectively referred to as 'communication information' which collectively reflects the plurality of conversations or communication events between the user and the contact(s), information from the publically trusted sources and the calendar 114 events. The captured communication information is stored in the memory 108 of the device 102. Further, the application 104 now arranges the captured communication information in chronological order for each contact.

The information retrieval module 122, thereafter, processes the chronologically arranged captured communication information using its one or more components. FIG. 2 illustrates the functions of the one or more components of the information retrieval module 122 for processing the communication information. The summarization module 124 executes summarization 202 of the captured communication information to convert the communication information into a short summary including lesser number of sentences than included in the captured communication information, such as maximum of one or two sentences providing a crisp gist of the captured communication information. For the messages which are not into text format, such as voice, image, multimedia, the application 104 may utilize artificial intelligent devices, (not shown in the FIG. 2), such as voice recognition to convert voice into text, an image recognition for converting image into a text describing the image, and a combination of both to convert a multimedia message into plain text message. Therefore, the summarization module 124 summarizes the captured communication information into short gist (such as snippet). After summarization 202, the application 104 executes clearing or removing 204 of redundant unimportant non-contextual words referred to as 'stop words' from the summarized conversations. Therefore, the application 104 cleans or removes the stop words, such as 'is', 'a', 'an', 'the', etc. from the summarized conversation.

Now the application 104 is presented with the summary which is further shortened, and which is ready for context or meaning generation 206 of the summary. Therefore, the context generation module 126 processes the summary of the captured communication information to determine and provide a context field to the remaining words in the summary for creating a contextual summary. In an embodiment, the application 104 determines the context field based on NER method (Name, Entity, Recognition), in which the context recognizes and tells whether the word is a person, place, location, time, day, organization, verb and the like. It may be apparent to a person skilled in the art that the application 104 may implement other context generation method present in the prior art, such as clustering and parsing based on syntax, and including others, without deviating from the meaning and scope of the present invention.

The application 104 further provides weightage to each word in the contextual summary, depending on the number of factors, using the weightage module 128. In an embodiment, the weightage module 128 considers factors including and not limited to the frequency of occurrences, chronological appearances, dictionary meaning, and the like to calculate weightage of each word. The application 104 performs frequency analysis 208 on the contextual summary generated by the context generation module 126. In frequency analysis 208, executed by the weightage module 128, all the words in the contextual summary are counted to determine their frequency of occurrences in all the communication events for a contact, also using the context attached to the words. Further, the frequency count for each word, along with its context, acts as an input for deciding on the weight of the word present in the contextual summary. Along with the frequency analysis 208, the weightage module 128 also performs time stamp analysis 210 for considering the chronological position of the communication events, in which the word appears, to calculate the weightage of the word. Therefore, a word appearing in a recent communication event is given more weightage. In addition to frequency and chronological order analysis, the weightage module 128 also considers the dictionary importance 212 of the word present in the contextual summary in order to decide the weightage of the word. For doing this, application 108 may have access to a dictionary available on the Internet or locally stored in the user device 102. Consequently, the weightage module 128 assigns weight to each word appearing in the chronologically arranged contextual summary based on the factors, such as including and not limited to frequency of occurrences 208, chronological order 210 and dictionary importance 212, and the like.

Thereafter, the application 104 calculates a confusion matrix 214 using the matrix creating module 130. After assigning weight to each of the word in the contextual summary representing communication information of the user with a contact, and also with all the contacts, a confusion matrix is calculated with each word being a feature. This confusion matrix acts as an estimation of a correlation coefficient between the various conversations (or communication events) of the user with his/her various contacts. These correlation coefficients provide those contacts of the user who are talking about same/similar topics and such contacts are grouped together by the application 104. These sets of contacts, talking about the same/similar topics, may be termed as "Contact Groups". The conversations with various contacts in a "Contact Group" may influence determining of the context of an upcoming communication event, such as an incoming or outgoing call and may also impact automatically suggested responses for the communication event, such as the messages. Therefore, a user is prompted with the conversation that he was having with the contact, while the application also tells the user that which other contacts of the user are talking to him about similar topics, by showing him the contacts in the 'contact group'. Each contact is assigned various topics that the contact is talking about with the user. Then a cross-correlation is calculated between each contact of the user and the set of users that are talking about similar topics, have maximum correlation and can be grouped into one contact group. Hence, creating a confusion matrix.

Further to creating contact groups, the application 104 creates intelligent keyword phrases or keyword collectives 216 for each contact, which accounts for weighted words used in the conversations in the communication events with that contact, and further to their importance in the conversations with other contacts belonging to the contact group(s) of that contact. Therefore, the keyword phrase or the keyword collective represents and highlights the importance of all the conversations with a contact, in a short crisp summary, while also bringing contextual meaning to the keyword phrase based on their frequency and time of occurrence and dictionary importance; along with the information shared with other contacts on similar topics and also the information available publically over the similar topics; and in addition, to the related information stored in the calendar events.

The application 104 stores the keyword phrases for each contact in the memory 108 of the user device 102. The keyword phrase is then presented (shown by 218) to the user on the user interface 120 of the application 108, allowing the user to gain contextual awareness of the recent conversation of the user with a contact. The keyword phrase is invoked and presented to the user, by the application 104, on a number of triggering events. In an embodiment, the application 104 presents the keyword phrase to the user on two triggering events. In an embodiment, one triggering event may be when the user chooses a contact from the contact list. In another embodiment, the triggering event may be when the user receives or makes a phone call from or to the contact. In yet another embodiment, the triggering event may be when the user receives or sends a message, including an SMS or an instant message, or an email, or other formats, from or to a contact. When such triggering events are detected by the application 104, the application 104 presents the generated keyword phrase to the user on the user interface 120.

In an exemplary environment, the application 104 promotes about the dues and account information that were sent by various banks to the user over emails and SMS messages whenever a triggering event like a call from a bank or a credit card agency is received by the user. In another exemplary environment, the application 104 promotes last prescription, appointments or test reports to the user whenever a triggering event like a call from a hospital is received by the user. So it is not just one to one communication, but also about corporate communications and information retrieval system that churns out the relevant information from the data stored on the phone or web portals of other service providers and renders them to a user on the fly.

Figure 3:
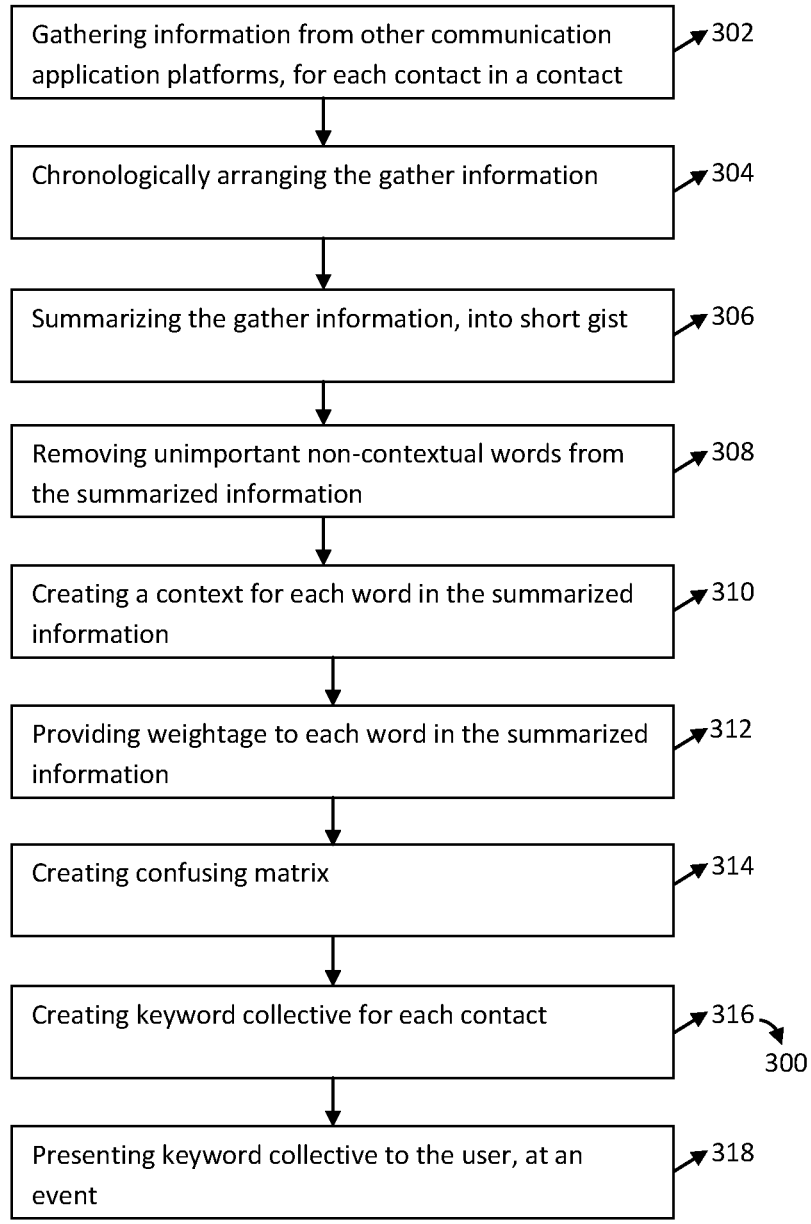
FIG. 3 illustrates a flowchart showing a method for generating the intelligent contextual keyword collective for a plurality of communication events in a multi-communication platforms environment, in accordance with an embodiment of the present invention.

FIG. 3 illustrates a flowchart showing a method 300 for generating the intelligent, contextual keyword collective for a plurality of communication events in a multi-communication platforms environment, in accordance with an embodiment of the present invention. The method is read considering the components of the FIGS. 1 and 2. The method 300 includes a step 302, where the application 104 silently captures information or messages exchanged in plurality of communication events between the user and a contact. The user utilizes the user device 102 for communicating with one or more of the contacts over the multiple communication channels 112 stored in the user device 102. The messages exchanged in the plurality of communication events between the user and a contact are captured by the application 104 in the background using the capturing module 116. In an embodiment, the messages may be in a variety of formats, such as including and not restricted to an SMS message, an instant message from over the various communication platforms 112, an email, a voice message, a multimedia, an image, or any other message exchanged on a social media platform. Along with gathering these messages, the application 104, simultaneously, also crawls the Internet to collect and save the information available publicly which is related to the communication events between the user and the contact(s). In addition to this, the application 104 also extracts information stored in the calendar events which are related to the communication events between the user and the contact(s). Such information, captured by the application 104 at the step 302, is collectively referred to as 'communication information' which reflects the plurality of conversations or communication events between the user and the contact(s), information from the publically trusted sources and the calendar 114 events.

Further at a step 304, the application 104 arranges the communication information in chronological order, for each contact. Thereafter, the application 104 implements the information retrieval module 122 to process the chronologically arranged communication information. while processing, the application 104 implements the summarization module 124, at step 306, for summarizing all the communication events in the communication information into a short, crisp summary, including and not restricted to one or two sentences. In an embodiment, the application 104 may implement one or more artificial intelligent devices for the messages which are not into text format, such as voice, image, multimedia, for example to convert voice into text, an image recognition for converting image into a text describing the image, and a combination of both to convert a multimedia message into plain text message. Therefore, the summarization module 124 summarizes the captured messages into short snippet.

Thereafter at a step 308, the application 108 removes redundant unimportant words, from the summarized snippet, which are referred to as 'stop words' from the summarized conversation. Therefore, the application 104 cleans or removes the stop words, such as 'is', 'a', 'an', 'the', etc. at the step 308. After removing the stop words, the application 104, at step 310, creates a context field for each word in the summarized snippet or gist, using the context generation module 126. In an embodiment, the application 104 determines the context field based on NER method (Name, Entity, Recognition), in which the context recognizes and tells whether the word is a person, place, location, time, day, organization, verb and the like. It may be apparent to a person skilled in the art that the application 104 may implement other context generation method present in the prior art, such as clustering and parsing based on syntax, and including others, without deviating from the meaning and scope of the present invention.

Further at a step 312, the application 104 implements the weightage module 128 for assigning a weight to each word present in the contextual summary or the contextual summarized snippet. The application 104 determines weight of each word in the contextual summary based on a number of factors, including and not restricting to frequency analysis of each word, chronological occurrence of each word, dictionary importance of each word and the like. Therefore, the application 104 may first count the number of times each word is occurring in all the communication events, along with considering its context in the events. Hence, for each word in the contextual summary, a weight is calculated taking the frequency and the context as input. In addition to this, the weight of the word is also affected by the chronological occurrence of the communication event in which that word is appearing. Therefore, a word appearing in a recent communication event is given more weightage. Further, the weight of the word is also affected by its dictionary importance. For doing this, application 108 may have access to a dictionary available on the Internet or locally stored in the user device 102. Consequently, the weightage module 128 assigns weight to each word appearing in the chronologically arranged contextual summary, at the step 312.

Furthermore at step 314, the application 104 implements the matrix creating module 130 for generating a confusion matrix. After the application 104 assigns weight to each word in the contextual summary of communication events with a contact, and also across all the contacts, a confusion matrix is created, which represents a plurality of contacts who are talking about the similar topics with the user. such contacts are grouped as 'contact groups', and the conversations with the contacts of the contact groups may influence determining of the context of an incoming or outgoing call, and also may impact creating a suggested response for the messages from the contacts.

Thereafter at step 316, the application 104 creates intelligent keyword phrases or keyword collectives for each contact, where the keyword phrase represents the recent conversations of the user with the contact, in a short contextual summary, bringing contextual importance to the keyword phrase based on their frequency and time of occurrence and dictionary importance; along with the information shared with other contacts on similar topics and also the information available publically over the similar topics; and in addition, to the information stored in the calendar events. Consequently, the application 104 presents the keyword phrase to the user at the user interface 120, at step 318, whenever the application 104 detects a triggering event. In another embodiment, a triggering event may be when the user chooses a contact from the contact list. In an embodiment, the triggering event may be when the user receives or makes a phone call from or to the contact. In yet another embodiment, the triggering event may be when the user receives or sends a message, including an SMS or an instant message, or an email, or other formats, from or to a contact. When such triggering events are detected by the application 104, the application 104 presents the keyword phrase to the user on the user interface 120.

Advantageously, the present invention provides a system, a method and an apparatus for creating a contextual keyword phrase(s) highlighting the essence of the recent communication events of the user with his/her contact(s), which accounts for the weightage given to each word in the keyword phrase depending on the frequency and chronological occurrences; and contextual meanings of the words in the communication events, along with the dictionary importance of the words. The keyword phrases are presented to the user on one or more triggering events, such as while receiving a call, or a message from the contact.

The user device 102 further includes an Input/Output module 106 which may include and is not restricted to a keyboard, a touch pad, a mouse, a camera, a speaker, a microphone, a display screen and the like, utilized by the user to send and/or receive messages or calls and execute a communication event. The user device 102 has a memory 108 and one or more processors for storing, running and processing the application 104. Further, the user device 102 also includes a contact list 110 stored in the memory 108. The contact list 110 of the user may include information related to a number of contacts of the user, where the information may include and is not restricted to name, phone number, address, email address, contact IDs on one or more communication platforms or applications, a picture, and the like.

Furthermore, the present invention may also provide contextual suggestions, along with the contextual summary, as a response to be provided by the user, for the recent conversations, in any triggering event. For example, while writing an email to a contact, the application may provide a contextual summary to the user highlighting the previous conversations; additionally, the application may also provide a contextual suggestion which can be opted by the user to be written as a response in the email.

Therefore, the present invention not only provides contextual summary of the previous conversations, but also provide weightage to the words in the contextual summary while formulating it, where the weightage may depend on number of times a word is occurring in the previous communication events along with its context field; chronological order of the communication events in which that word is appearing; and the dictionary importance of the word. Along with this, the present invention also influences the context in the summary depending on the contact groups sharing the similar topics, information available in public sources over similar topics, and calendar events related to user, contacts, or similar topics.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

I claim:

1. A system for creating and providing an intelligent contextual keyword phrase to a user using a user device, the system comprising:
   the user device including:
      a memory storing the application executable by one or more processors at the user device;
      a contact list of one or more contacts stored in the memory;
      one or more communication applications stored in the memory and executable by one or more processors at the user device for providing communication platforms to the user and executing plurality of communication events at the user device; and
   the application including:
      a capturing module for creating communication information that includes information related to a plurality of communication events between the user and each contact in the contact list and one or more communication events of the user on one or more web-based servers, and the capturing module arranges the communication information in chronological order for communication events related to each contact in the contact list and the web-based servers;
      a summarization module for summarizing the chronologically arranged captured communication information into a summarized gist;
      a context generation module for providing a contextual meaning to every word included in the summarized gist to create a contextual summary;
      a weightage module for providing a contextual weightage to each word in the contextual summary; and
      a matrix creating module for creating a confusion matrix that correlates the contextual summary with one or more other contacts in the contact list based on conversations between the user and the one or more other contacts in the contact list that are related to the contextual summary; and
   wherein the application creates the intelligent contextual keyword phrase for one or more communication events between the user and each contact in the contact list, and one or more communication events of the user on the one or more web-based servers, the intelligent contextual keyword phrase includes the contextual summary along with its associated confusion matrix.

2. The system as claimed in claim 1, wherein the communication information is created by capturing conversations between the user and the one or more contacts of the contact list and gathering information, related to the user, from the one or more web-based servers and gathering information from one or more events stored in a calendar at the user device.

3. The system as claimed in claim 1, wherein the summarization module further clears redundant unimportant non-contextual words referred to as 'stop words' from the summarized gist, the stop words include 'is', 'a', 'an', 'the' and other non-contextual words.

4. The system as claimed in claim 1, wherein the context generation module determines the contextual meaning of each word in the summarized gist based on an NER method (Name, Entity, Recognition) in which the contextual meaning recognizes and tells whether the word is a person, place, location, time, day, organization, or a verb.

5. The system as claimed in claim 1, wherein the context generation module implements clustering and parsing methods based on syntax for providing contextual meaning to the words in the summarized gist and creating the contextual summary.

6. The system as claimed in claim 1, wherein the weightage module provides the contextual weightage to each word in the contextual summary by:
   implementing frequency analysis that includes calculating frequency of occurrences of each word, along with its contextual meaning, in the one or more communication events; and
   implementing time stamp analysis that includes determining chronological appearances of each word in the one or more communication events; and
   by determining dictionary meaning of each word.

7. The system as claimed in claim 1, wherein the matrix creating module correlates the contextual summary with 'contact groups', the contact groups include the one or more contacts in the contact list that communicate with the user on similar topics as that of the contextual summary.

8. The system as claimed in claim 1, wherein the communication events include conversation such as voice calls or exchanging SMS message, an instant message from over the communication platforms, an email, a voice message, a multimedia, an image, or any other message exchanged on a communication platform.

9. The system as claimed in claim 1, wherein the application further prompts the intelligent contextual keyword phrases to the user, at the user device, at one or more triggering events, the one or more triggering events include when the user chooses a contact from the contact list, or when the user receives or makes a phone call from or to the contact, or when the user receives or sends a message including an SMS or an instant message, or an email, or other formats, from or to a contact.

10. The system as claimed in claim 1, wherein the user device is a computing device capable of executing the plurality of communication events related to the user, the computing device includes a laptop, a desktop, a smart phone, an I-phone, a tablet, or an I-Pad, and the plurality of communication events are being executed over a network that includes the Internet.

11. A method of creating and providing an intelligent contextual keyword phrase to a user using a user device, the intelligent contextual keyword phrase being created and provided to the user by an application stored in memory of the user device and executable by one or more processors at the user device, the method comprising:
   creating, by a capturing module of the application, communication information that includes information related to a plurality of communication events between the user and each contact in a user contact list and one or more communication events of the user on one or more web-based servers, the contact list being stored at the user device of the user, and the plurality of communication events being executed at the user device;
   arranging, by the capturing module, the communication information in chronological order for the plurality of communication events related to each contact in the contact list and the web-based servers;
   summarizing, by a summarization module of the application, the chronologically arranged captured communication information into a summarized gist;
   providing, by a context generation module of the application, a contextual meaning to every word included in the summarized gist to create a contextual summary;
   providing, by a weightage module of the application, a contextual weightage to each word in the contextual summary; and
   creating, by a matrix creating module of the application, a confusion matrix that correlates the contextual summary with one or more other contacts in the contact list based on conversations between the user and the one or more other contacts in the contact list that are related to the contextual summary; and
   wherein the application creates the intelligent contextual keyword phrase for one or more communication events between the user and each contact in the contact list, and one or more communication events of the user on the one or more web-based servers, the intelligent contextual keyword phrase includes the contextual summary along with its associated confusion matrix.

12. The method as claimed in claim 11 further comprises prompting the intelligent contextual keyword phrases, by the application, to the user, at the user device, at one or more triggering events, the one or more triggering events include when the user chooses a contact from the contact list, or when the user receives or makes a phone call from or to the contact, or when the user receives or sends a message including an SMS or an instant message, or an email, or other formats, from or to a contact.

13. The method as claimed in claim 11, wherein the communication information is created by capturing conversations between the user and the one or more contacts of the contact list and gathering information, related to the user, from the one or more web-based servers and gathering information from one or more events stored in a calendar at the user device.

14. The method as claimed in claim 11, wherein the summarization module further clears redundant unimportant non-contextual words referred to as 'stop words' from the summarized gist, the stop words include 'is', 'a', 'an', 'the' and other non-contextual words.

15. The method as claimed in claim 11, wherein the context generation module determines the contextual meaning of each word in the summarized gist based on an NER method (Name, Entity, Recognition) in which the contextual meaning recognizes and tells whether the word is a person, place, location, time, day, organization, or a verb.

16. The method as claimed in claim 11, wherein the weightage module provides the contextual weightage to each word in the contextual summary by:
   implementing frequency analysis that includes calculating frequency of occurrences of each word, along with its contextual meaning, in the one or more communication events; and
   implementing time stamp analysis that includes determining chronological appearances of each word in the one or more communication events; and
   by determining dictionary meaning of each word.

17. The method as claimed in claim 11, wherein the matrix creating module correlates the contextual summary with 'contact groups', the contact groups include the one or more contacts in the contact list that communicate with the user on similar topics as that of the contextual summary.

18. The method as claimed in claim 11, wherein the communication events include conversation such as voice calls or exchanging SMS message, an instant message from over the communication platforms, an email, a voice message, a multimedia, an image, or any other message exchanged on a communication platform.

19. A non-transitory computer readable recording medium having recorded therein at least part of a software application executable, at least partly, by one or more processors of a user device to perform a method, the user device includes:
the one or more processors;
memory storing at least part of operating system to facilitate, at least in part, operations of the software application; and
wherein the method comprising:
creating, by a capturing module of the application, communication information that includes information related to a plurality of communication events between the user and each contact in a user contact list and one or more communication events of the user on one or more web-based servers, the contact list being stored at the user device of the user, and the plurality of communication events being executed at the user device;
arranging, by the capturing module, the communication information in chronological order for the plurality of communication events related to each contact in the contact list and the web-based servers;
summarizing, by a summarization module of the application, the chronologically arranged captured communication information into a summarized gist;
providing, by a context generation module of the application, a contextual meaning to every word included in the summarized gist to create a contextual summary;
providing, by a weightage module of the application, a contextual weightage to each word in the contextual summary;
creating, by a matrix creating module of the application, a confusion matrix that correlates the contextual summary with one or more other contacts in the contact list based on conversations between the user and the one or more other contacts in the contact list that are related to the contextual summary; and
prompting the intelligent contextual keyword phrases that includes the contextual summary along with its associated confusion matrix, by the application, to the user, at the user device, at one or more triggering events, and wherein the application creates the intelligent contextual keyword phrase for one or more communication events between the user and each contact in the contact list, and one or more communication events of the user on the one or more web-based servers, the intelligent contextual keyword phrase includes the contextual summary along with its associated confusion matrix.

20. The medium of claim 19, wherein the application prompts the intelligent contextual phrases at the one or more triggering events that include when the user chooses a contact from the contact list, or when the user receives or makes a phone call from or to the contact, or when the user receives or sends a message including an SMS or an instant message, or an email, or other formats, from or to a contact.

21. The medium of claim 19, wherein the communication information is created by capturing conversations between the user and the one or more contacts of the contact list and gathering information, related to the user, from the one or more web-based servers and gathering information from one or more events stored in a calendar at the user device.

22. The medium of claim 19, wherein the context generation module determines the contextual meaning of each word in the summarized gist based on an NER method (Name, Entity, Recognition) in which the contextual meaning recognizes and tells whether the word is a person, place, location, time, day, organization, or a verb.

23. The medium of claim 19, wherein the weightage module provides the contextual weightage to each word in the contextual summary by:
implementing frequency analysis that includes calculating frequency of occurrences of each word, along with its contextual meaning, in the one or more communication events; and
implementing time stamp analysis that includes determining chronological appearances of each word in the one or more communication events; and
by determining dictionary meaning of each word.

24. The medium of claim 19, wherein the matrix creating module correlates the contextual summary with 'contact groups', the contact groups include the one or more contacts in the contact list that communicate with the user on similar topics as that of the contextual summary.

* * * * *